Feb. 1, 1944.    K. G. STERN    2,340,825
CENTRIFUGE
Filed Sept. 9, 1941    4 Sheets-Sheet 1
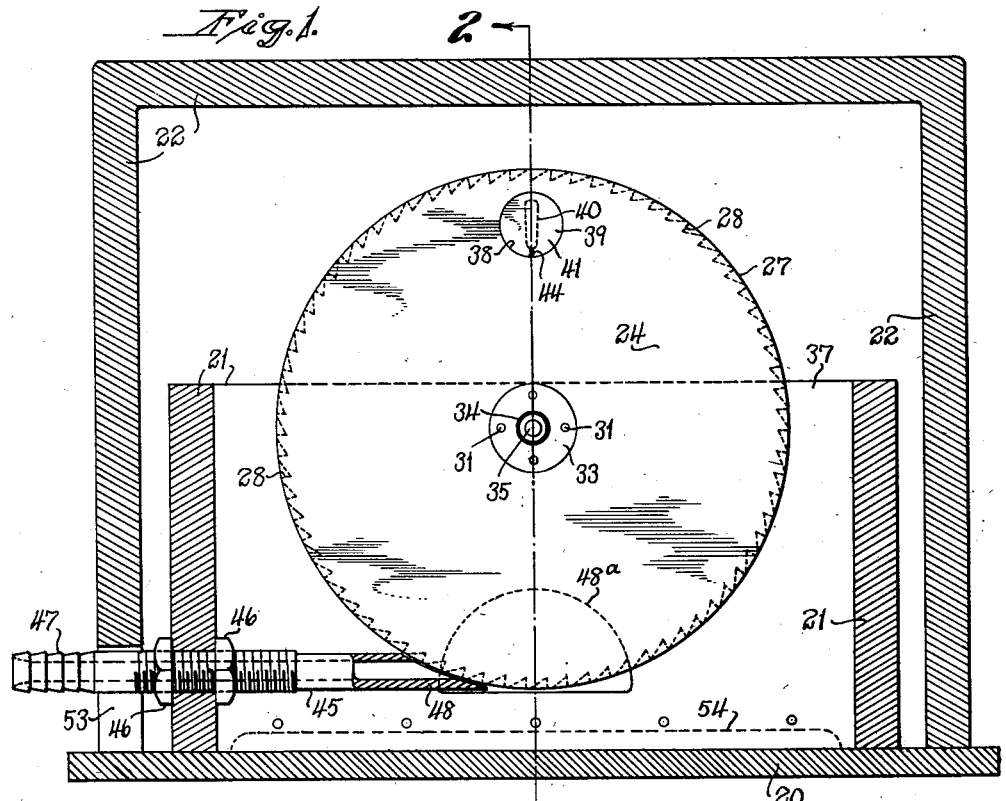
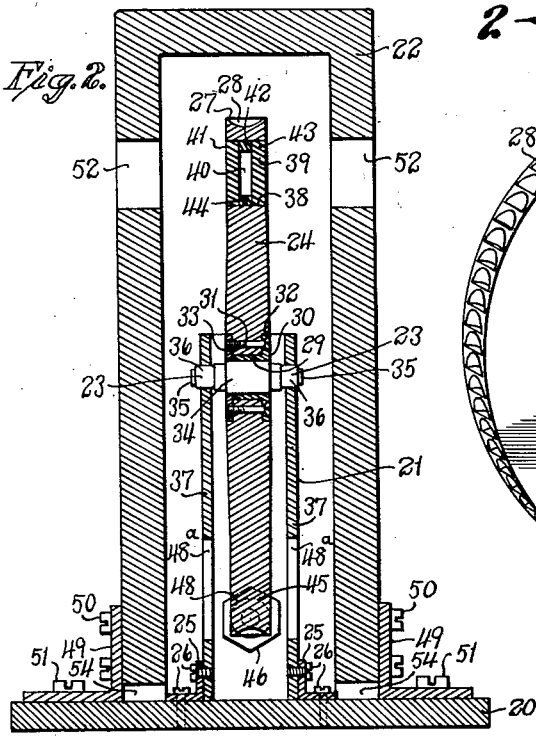
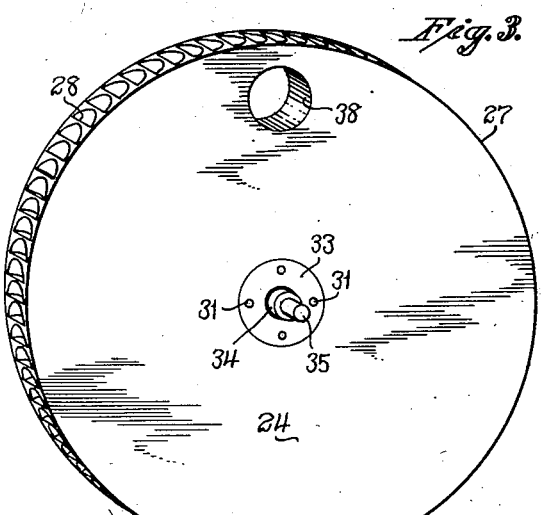
Inventor
by Kurt G. Stern
Seymour Earle & Nichol
Attorneys Feb. 1, 1944. K. G. STERN 2,340,825
CENTRIFUGE
Filed Sept. 9, 1941 4 Sheets-Sheet 2
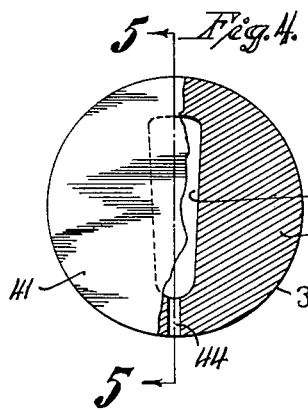
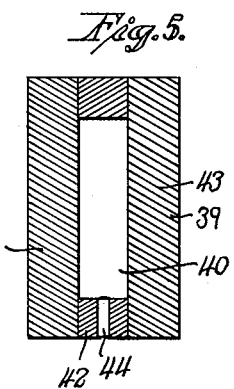
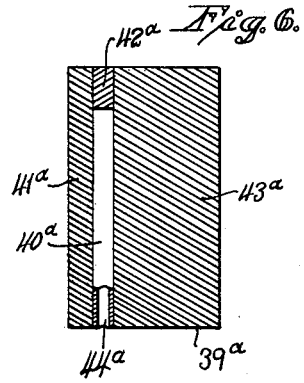
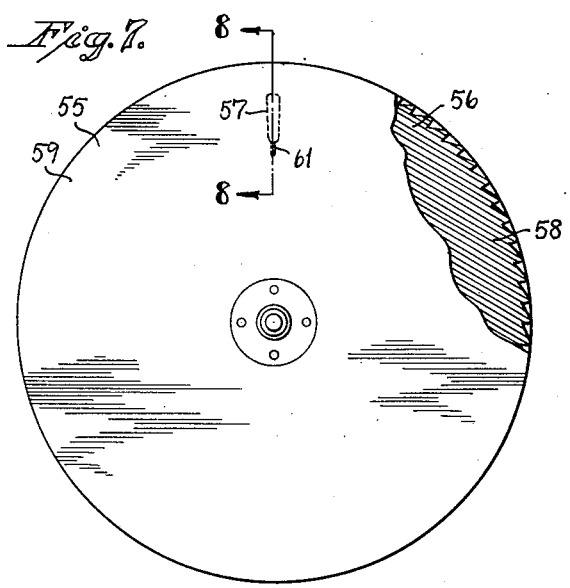
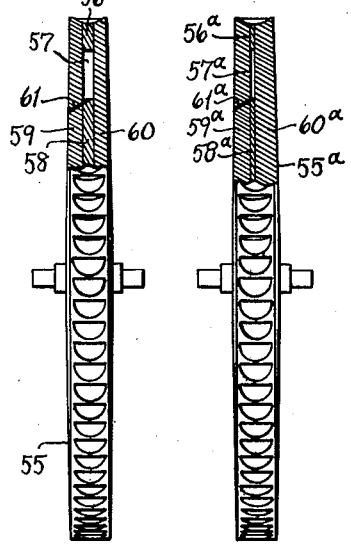
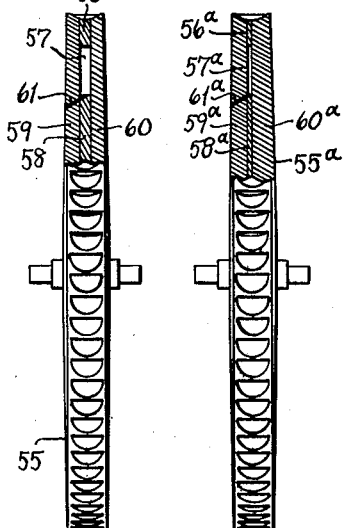
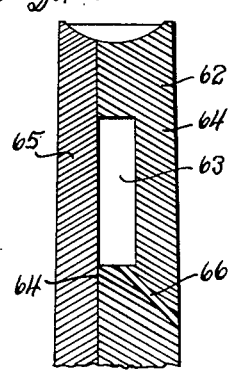
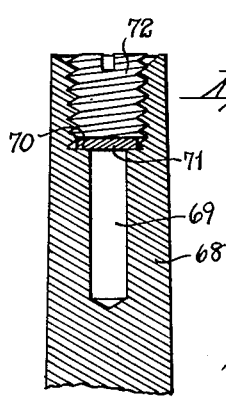
Inventor
Kurt G. Stern
Seymour Earle Nichols
Attorneys Feb. 1, 1944.     K. G. STERN     2,340,825
CENTRIFUGE
Filed Sept. 9, 1941    4 Sheets-Sheet 3

Inventor
by Kurt G. Stern
Seymour Earle Nichols
Attorneys

Feb. 1, 1944.   K. G. STERN   2,340,825
CENTRIFUGE
Filed Sept. 9, 1941   4 Sheets-Sheet 4
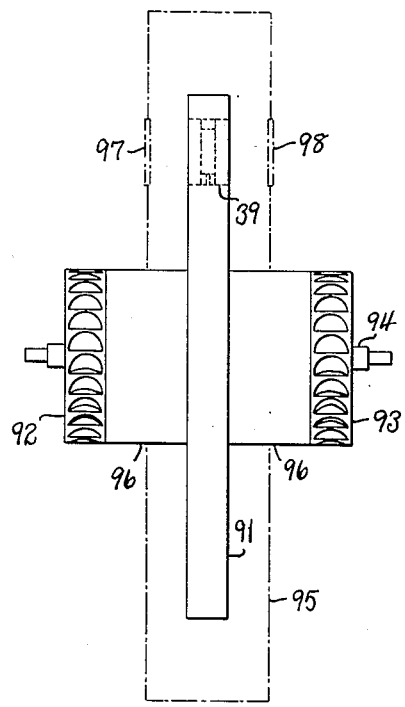
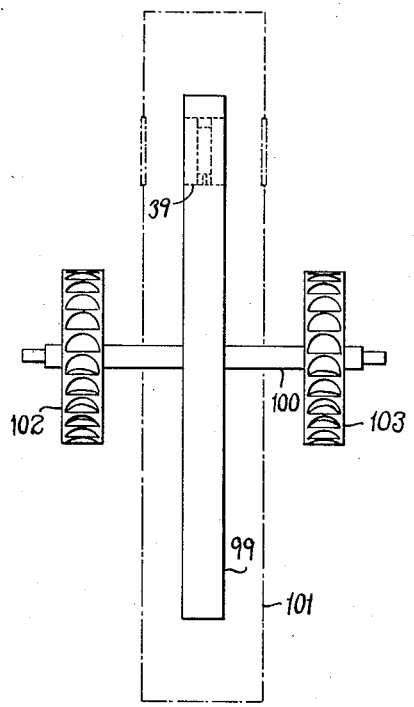
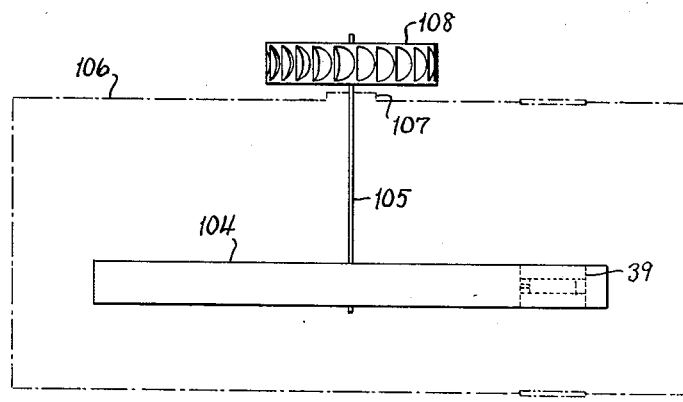
Inventor
Kurt G. Stern
By Seymour Ruell Nichols
Attorneys Patented Feb. 1, 1944

2,340,825

UNITED STATES PATENT OFFICE 2,340,825

CENTRIFUGE

Kurt G. Stern, New Haven, Conn., assignor to Research Corporation, New York, N. Y., a corporation of New York Application September 9, 1941, Serial No. 410,178

8 Claims. (Cl. 233—26)

The present invention relates to improvements in centrifuges, and is adapted for use as an analytical ultra-centrifuge, and for the optical study in intense gravitational fields during high-speed centrifugation, of the boundaries of molecularly-dispersed colloids of organic and inorganic nature as well as the behavior of microscopical objects such for example as single cells.

One object of the present invention is to provide an improved centrifuge of simple construction.

Another object of the present invention is to provide an improved centrifuge capable of accomplishing results not possible with previous centrifuges.

With the above and other objects in view, as will appear to those skilled in the art from the present disclosure, this invention includes all features of the said disclosure which are novel over the prior art.

Owing to the enormous stresses and consequent strains which occur in centrifuges, high-strength materials such as steels and light-metal alloys have heretofore been employed for the larger-diametered rotating portions of centrifuges of the nature herein dealt with. The invention broadly comprises the construction of the main, stress-carrying rotating members of centrifuges of plastic compositions. Centrifuges constructed of such compositions in accordance with my invention worked with perfect satisfaction without bursting under the stresses set up in the rotating parts, and resulted in advantages and new results which are entirely impossible of attainment with rotors formed of metal. While I do not rely upon any particular theory as to why centrifuges in which the rotors are formed of plastic are not only successful but give unexpected new results, it appears that part of the explanation resides in the fact that the plastic has a very low modulus of elasticity as compared to either steel or aluminum alloys or other metals.

Where such terms as "plastic," "plastic resins," "synthetic resins" or "plastic material" are used, it is intended to refer to such types of materials for example as polyacrylic, polystyryl, polyvinyl, phenol formaldehyde, cellulose nitrate and cellulose acetate plastics. Owing largely to the optical advantages of polymerized methyl methacrylate resin, commercially known as Lucite, whereby this material is obtainable in very high transparency free from any color, I have preferred to construct my centrifuges of this material. Lucite has a tensile strength of from 9,000 to 12,000 lbs. per square inch, a specific gravity of from 1.18 to 1.20, and a modulus of elasticity of approximately between 500,000 and 1,000,000 as compared with a modulus of elasticity of 30,000,000 for steel.

It will thus be seen that the modulus of elasticity of Lucite is only from $1/30$ to $1/60$ of the modulus of elasticity of steel, which means that Lucite will stretch within its elastic limit from thirty to sixty times as far as steel will stretch under the same stress per unit of area. Thus, it will be seen that in a rotor constructed of Lucite, even though there be certain irregularities of internal stresses in the rotor when at rest, under the high stresses resulting from centrifugal force the Lucite tends, owing to the very low modulus of elasticity of this material, to avoid producing a higher localized stress at any location than the material is capable of standing, thus minimizing the tendency of a stress at any location in a Lucite rotor from rising higher than the material can stand, thus avoiding starting a rupture at such a location. It will be appreciated, that if in any rotating rotor, a unit or fiber stress is induced which is greater than the tensile strength of the material at that point, rupture will be started there and ordinarily will rapidly extend through adjacent portions of the rotating rotor to quickly result in bursting of the rotor. But whatever the correct explanation may be as to the fact that rotors made of plastic, surprisingly withstand the stresses involved, the fact remains that unexpected results and advantages flow from the employment of rotors made of plastics.

Another important advantage resulting from rotors made of plastic, is the low specific gravity of plastic. Thus, Lucite has a specific gravity or density as above given, which approaches closely the specific gravity or density of the solutions to be studied in these centrifuges. Heretofore in the making of rotors of metal, it has been necessary to make an insertable and removable analytical cell which is placed near the periphery of the rotor, but on account of this cell of necessity being of greatly different specific gravity from the material of the rotor, it has been necessary to balance this analytical cell by a similar balancing cell placed in the rotor diametrically opposite, thus further weakening the rotor and resulting in extra cost for the balancing cell construction. In the case of my improved rotor and cell made of plastic, on account of the fact that the cell together with the liquid which is placed in the cell to be examined, is of substantially the same specific gravity as the rotor itself, it is unnecessary to place any balancing cell in the rotor, thus providing a stronger simpler construction. And even greater strength is obtained in the rotor when the analytical cell forms an integral part of the rotor.

Where I use the term "ultracentrifuge," I mean a device which permits of molecular sedimentation undisturbed by mechanical vibrations or thermal convection currents induced in the dispersed fluid system under study which may, for example, be a smoke, a solution or a mechanical suspension, the definition of an ultracentrifuge not necessarily being linked with the intensity of the centrifugal field employed.

Centrifuge rotors made in accordance with my invention run substantially free from mechanical vibration, even when the rotor is horizontally mounted, and in a commercial type of roller bearing. This important fact is due to the low specific gravity of plastic, whereby the total weight of the rotor is so light that only a small load is placed on the bearings, so that it has been possible to employ a commercial type of roller bearing instead of the elaborate and costly piston-actuated journal bearings employed in the oil-driven steel-rotor ultracentrifuges of Svedberg.

In the case of centrifuge rotors of high heat-conductivity, such as metal rotors, a considerable part of the cause of thermal convection currents induced in a dispersed fluid system in the cell of the rotor, is due to the friction of the axle of the rotor with the bearings, and the diffusion of the heat thus generated, from the center of rotation to near the periphery of the rotor where the fluid system under study is located. Rotors in accordance with my invention, made of plastic, on the other hand, are characterized by their relatively-low heat conductivity, which property leads to the establishment of a barrier between the source of heat-production, that is, the axle, and the cell containing the fluid material under study, thus substantially preventing heat from the axle being transmitted to and heating the fluid-containing cell, and thus preventing convection currents arising from this heat.

The fact that the plastic material has a low density which approaches that of the solution to be placed in the cell-chamber to be centrifuged and that both the rotor which carries the cell and the cell itself can both be made of the same density of material, results in substantial homogeneity of the field during centrifuging and limits the stresses arising during spinning to the minimum possible.

The low density of the plastic, the fairly-high tensile strength of the plastic and its relatively-low modulus of elasticity permit of obtaining the ideal thin cylindrical disk-shape of a high-speed rotor. Thus, the ratio between thickness at the cell-holes and diameter is from 0.22 to 0.27 in shell rotors, whereas in the case of a 6" plastic rotor such as shown in Figs. 1 to 3, this ratio has been reduced to 0.066.

Rotors either for centrifuging use or for test purposes can be made of transparent plastic, and by viewing the rotors either when at rest against a diffused light source with the rotors located between two crossed Polaroid screens or Nicol prisms will show stress patterns in accordance with any unequal stresses introduced by machining the cell-retaining holes in the rotor and machining the arbor- and screw-receiving holes near the center of the rotor, etc. Stresses resulting from machining and from fastening the arbor in the rotor, can be removed by an annealing process consisting in subjecting the rotor to controlled heating to the softening point and slowly subsequently cooling the rotor, employing observations through polarizing optics as a means of accurate control. Also, stress patterns introduced in rotors during rotation of the rotors at high speed can be studied by employing polarizing optics in connection with the well-known type of stroboscopic lighting device.

As the detailed description of the particular forms of the invention shown in the drawings are explained, the foregoing advantages together with a number of additional advantages will become clear.

In the accompanying drawings forming part of the present disclosure, in which certain ways of carrying out the invention are shown for illustrative purposes:

Fig. 1 is a longitudinal vertical sectional view, partly in elevation, through a centrifuge made in accordance with the present invention;

Fig. 2 is a vertical sectional view on the plane indicated by the line 2—2 of Fig. 1;

Fig. 3 is a perspective view of the rotor of the centrifuge shown in Figs. 1 and 2;

Fig. 4 is an enlarged front elevation, partly in section, of the removable analytical cell shown removably mounted in the rotor in Figs. 1 and 2;

Fig. 5 is a vertical sectional view on the plane indicated by line 5—5 of Fig. 4;

Fig. 6 is a sectional view similar to Fig. 5 of an analytical cell in which the thickness of the parts is of different proportion;

Fig. 7 is a front elevation, partly in section, of a modified form of rotor in which the analytical cell is built as an integral portion of the rotor;

Fig. 8 is a vertical sectional view, partly in elevation, on a plane indicated by line 8—8 of Fig. 7;

Fig. 9 is a view similar to Fig. 8 of a rotor in which the thickness of the plastic parts is of different proportion;

Fig. 10 is a fragmental sectional view similar to the upper portion of Fig. 8, of a modified form of rotor construction;

Fig. 11 is a fragmental sectional view similar to the upper portion of Fig. 8, of another modified form of rotor construction;

Fig. 16 is a view similar to Fig. 15 of another modified form of rotor employed in connection with a vacuum chamber indicated diagrammatically in broken-line outline;

Fig. 17 is a view similar to Fig. 16 of still another modified form of rotor employed in connection with a vacuum chamber indicated diagrammatically in broken-line outline; and Fig. 18 is a view similar to Fig. 17 of a modified form of rotor for rotation about a vertical axis in a vacuum chamber indicated diagrammatically in broken-line outline.

Figure 12:
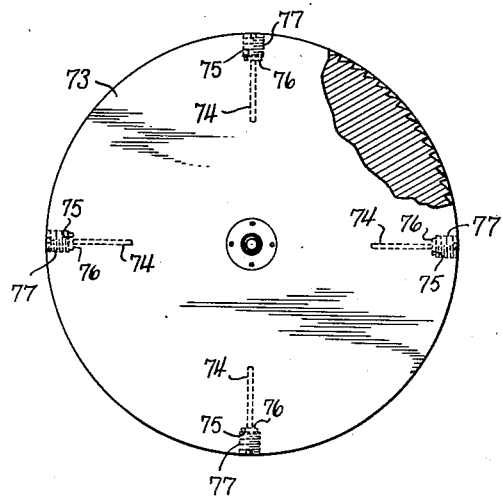
Fig. 12 is a front elevation similar to Fig. 7, of a rotor having a plurality of cells similar to the cell shown in Fig. 11.

Referring to Figs. 1 to 5 inclusive which illustrate one form of centrifuge made in accordance with the present invention, a base 20 supports a housing formed as two parts or members 21 and 22, the lower housing part or member 21 serving as a support to carry the bearings 23 for the rotor 24, and preferably being secured to the base 20 by any suitable means such for example as angle-members 25 and screws 26.

In an actual embodiment of the invention which was constructed in accordance with the showing in Figs. 1 to 5 inclusive, the rotor 24 was formed of a single sheet or plate of cast Lucite having an outside diameter of 6", and having its periphery 27 of general circular form and provided with flutings or blades 28 milled therein to drive the rotor 24 as a turbine by means of a stream of air under pressure. The rotor 24 has a round central hole 29 in which is press-fitted a brass bushing 30. A plurality of screws 31 extend through holes in the flange 32 of the bushing 30 and threadedly engage in a brass clamping-ring 33. If desired, the threaded ends of the screws 31 can be upset to inhibit any possible tendency of them to become loose. A shaft or arbor 34 has a force or press fit in the bushing 30 and is formed or tool or other steel which can be hardened. The opposite ends of trunnions 35 of the arbor 34 are about $3/16$" in diameter and hardened and polished so as to form the inner race of the $3/16$" roller bearing 23 known as a "Torrington needle bearing," the outer race 36 of which has a force or press fit in the side-plates 37 of the housing part 21.

The rotor 24 is provided with a cylindrical hole 38 therethrough to provide a cell-retaining chamber for an analytical cell 39 which latter is made to have a suitable friction fit within the hole 38 so that the cell 39 can be pushed into place in, or pushed out of place out of, the hole 38, by moderate pressure by a finger.

The analytical cell 39 has a cell-chamber 40 of sector-shape. The cell 39 is formed from three sheets or plates of Lucite 41, 42 and 43 integrally united together in any suitable way as for example by employing a Lucite cement or any suitable solvent of Lucite. As Lucite cement polymerizes to form Lucite, the entire assembly of sheets or disks therefore becomes one indissoluble unit of Lucite throughout. The two outside sheets or plates or Lucite 41 and 43 which overlie opposite sides of the cell-chamber 40, are preferably formed of transparent colorless Lucite, while the intermediate or spacer sheet or plate of Lucite 42 is preferably formed of opaque Lucite, although it may be formed of a colored transparent Lucite, the object being to have the intermediate sheet 42 of relatively-less light-transmitting power than the outside sheets 41 and 42, so as to aid in optically defining the cell-chamber and aiding in clear optical and photographical definition of the boundary of the cell-chamber when the device is in use during rotation. A small hole 44 is provided so that the liquid to be centrifuged can be inserted into and removed from the cell-chamber 40 by means of a hypodermic syringe.

In order to supply compressed air or other fluid-drive means for the rotor 24, a tube 45 is provided with a threaded exterior and nuts 46 by which the tube 45 may be clamped in an opening through one end of the housing-part 21. The left end of the tube 45 is adapted to have any suitable supply-hose or the like from a source of compressed air or other fluid medium connected at 47, and has the other end shaped as shown to form a nozzle 48 to supply the air in a stream against the flutings or blades 48 of the rotor 24 for the purpose of driving the rotor at high speed.

Openings 48a through the opposite walls 37 of the housing-part 21 provide a ready escape for the air which issues from the nozzle 48.

The protective cover or housing-member 22 is preferably formed of iron or steel of sufficient thickness and strength to provide a safeguard against danger in event of bursting of the rotor.

The housing-member 22 may be provided with angle-members 49 connected thereto by screws 50, and may if desired be connected to the base 20 by its screws 51. The housing-member 22 is provided with holes 52 through its side-walls in line with each other and in line with the hole 38 of the rotor at one position of rotation of the rotor, such for example as its vertically-uppermost position. The vertical slot 53 in the housing-member 22 permits it to clear the tube 45 when the housing-member 22 is placed in its position as shown or is removed from such position, and the horizontal slots or recesses 54 are to provide for ready escape of the air which issues from the openings 48a in the housing-member 21.

Employing well-known apparatus which passes intermittent flashes of light at a proper flashing rate to synchronize with the speed of rotation of the analytical cell and having the flashes occur when the cell is in its vertically-uppermost position properly aligned with the holes 52 through the opposite walls of the housing-member 22, from one side of the housing, permits of the use of any suitable optical mechanism such as a microscope for optically observing the sedimentation of the material located in the cell-chamber 40 of the cell 39. Instead of employing a microscope for optical observation by an observer, a suitable photographic mechanism can be employed for photographing sedimenting boundaries resulting from the sedimentation induced by the centrifugal force resulting from rotation of the rotor.

Fig. 6 illustrates an analytical cell 39a similar to the analytical cell 39 shown in Figs. 4 and 5 except that the proportions of the thickness of the layers of plastic used in building up the cell are different. Thus, the cell 39a has a thinner cell-chamber 40a formed by a relatively-thin opaque or colored intermittent or spacer sheet of plastic 42a cemented or otherwise integrally united with colorless transparent sheets of plastic 41a and 43a. Thus, by having the intermediate opaque or colored lamination of any thickness or thinness desired, and by having the transparent colorless observation-window 41a of any thinness practical or thickness desired, the distance of the analytical cell 40a from the outside surface of the observation-window 41a may be varied at will to suit the requirements of the particular optical system employed. Thus, if high-power objectives of short focal length of a microscope are to be used in the study of minute particles in centrifugal fields, it is of advantage to have a thin transparent observation-window 41a on the side of the fluid-cell situated near the microscope objective, and to have a thin cell-chamber 40a.

Instead of employing a removable analytical cell such as has been described in connection with Figs. 1 to 6 inclusive, Figs. 7 and 8 illustrate a rotor 55 which is similar to the rotor 24 shown in Figs. 1 to 3, except that this rotor is formed of three sheets or laminations of plastic cemented together instead of being formed of a single sheet of plastic, thus permitting of providing the rotor 55 with an analytical cell 56 which is formed as an integral part of the rotor 55 to provide a cell-chamber 57. This integral cell 56 is formed as shown in Fig. 8 by a central opaque or colored sheet 58 of plastic having a sector-shape cut-out slot or space to form the cell-chamber 57 when the spacer-sheet 58 is cemented between two outside or window sheets or laminations 59 and 60. In this form of the invention an angularly-directed small hole 61 is drilled through one of the sheets 59 or 60 into the bottom portion of the cell-chamber 57 to provide for filling the cell-chamber with the material to be centrifuged and to remove it therefrom by means of a hypodermic syringe or the like.

The form of rotor 55a illustrated in Fig. 9 is substantially the same as that illustrated in Fig. 8 except that the proportions or thicknesses of the cell-chamber 57a and of the sheets 58a, 59a and 60a of plastic are of similar proportions respectively to the cell-chamber 40a and sheets 42a, 41a and 43a of plastic of the analytical cell 39a shown in Fig. 6.

Fig. 10 shows an enlarged fragmental portion of a rotor 62 and integral cell similar to the construction shown in Figs. 7 and 8. In the construction shown in Fig. 10 the cell-chamber 63 may be formed by machining it in a relatively-thick sheet of plastic 64 and polishing its bottom. A transparent colorless sheet of plastic 65 is cemented to the sheet 64. A hole 66 can be drilled either from the inside before the two sheets are cemented together or can be drilled from the outside after the two sheets have been cemented together. If desired, the portion of the surface 67 of sheet 64 surrounding and adjacent the cell-chamber 63 can be coated with opaque or colored material prior to or at the time of cementing the two sheets together. Or an opaque or colored cement can be employed for cementing the two sheets together.

The form of construction illustrated in Fig. 11 illustrates a rotor 68 formed of a single sheet or plate of transparent plastic which has an analytical cell-chamber 69 drilled therein from the outer periphery of the rotor, a flat seat 70 being formed to receive thereagainst a washer 71 of soft rubber, suitable plastic or other suitable material, which is pressed into liquid-tight position by means of a screw 72 of plastic which screw-threadedly engages a correspondingly screw-threaded hole in the rotor. The material to be centrifuged in the cell-chamber 69 is inserted therein before the packing 71 and screw 72 are inserted in place, of course, and in order to remove the centrifuged material therefrom, the packing 71 and screw 72 are removed.

The outer generally-circular periphery of all of the forms of rotor heretofore illustrated are provided with flutings or blades whereby the rotors can be driven by compressed air or the like, as has been more fully described concerning the rotor 24 shown in Figs. 1 to 3.

The form of construction illustrated in Fig. 12 illustrates a rotor 73 formed of transparent plastic which has a plurality of analytical cells having cell-chambers 74 drilled therein from the outer periphery of the rotor, a flat seat 75 being formed to receive thereagainst a washer 76 which is pressed into liquid-tight position by means of a screw 77 of plastic which screw-threadedly engages a correspondingly screw-threaded hole in the rotor, the construction of each of these analytical cells being similar to the analytical cell illustrated in Fig. 11. The tubular cell-chambers 74 are preferably of small diameter corresponding to hematocrit tubes used in the determination of cell-volumina for clinical and research purposes. By placing the fluid to be examined, for example, blood, in the cell-chambers 74 and properly sealing the cell-chambers with the washers 76 and screws 77, a number of samples of fluid can be centrifuged at the same time by rotation of the rotor 73. If a beam of parallel light or of divergent light is directed transversely through the transparent rotor onto a graduated screen, the progress of sedimentation and packing process during centrifuging, can be observed on the screen. In this way, centrifuging can be continued until the image of the tubes, as projected on the screen, no longer shows any contraction of the blood-cells in the analytical cells. If several analytical cells of the same length and radial location are filled with the same fluid, an optical average of the blood-cell volume can be secured in this way by observing the composite image of all of the analytical cells or tubes contained in the rotor. For individual measurements, the rotor would be stopped and each analytical cell or tube brought individually before the projection screen for measurement of the sedimented or packed blood-cells or other material in each analytical cell.

Figure 13:
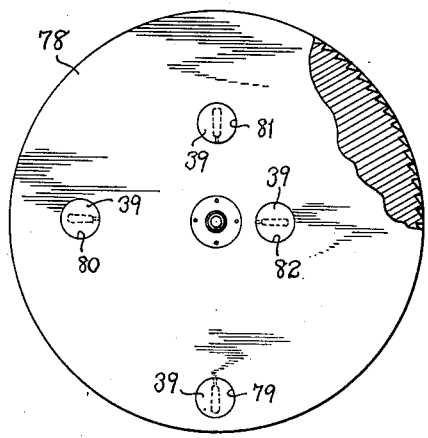
Fig. 13 is a front elevation similar to Fig. 12, of a rotor having a plurality of cells located at different radii from the center of the rotor.

In the form of construction illustrated in Fig. 13, a rotor 78 is formed of plastic which is provided with a plurality of cell-retaining holes or openings 79, 80, 81, 82, to each removably receive an analytical cell 39. By locating the cell-retaining holes at various radial distances from the axis of the rotor, the analytical cells therein can be subjected to gravitational forces of different strengths. This is of advantage in ultracentrifugal runs of long duration, that is, in sedimentation equilibrium runs, since it permits of simultaneously centrifuging several fluid samples contained in the different analytical cells located at various distances from the center of rotation of the rotor and consequently subject to centrifugal or gravitational forces of different strengths. The progress of the sedimentation can be observed visually or recorded photographically by training separate optical systems on each annular lane through which the cell travels during rotation, or by arranging the camera in such manner that it may be shifted into any desired radial position from the periphery down to the center of rotation.

Figure 14:
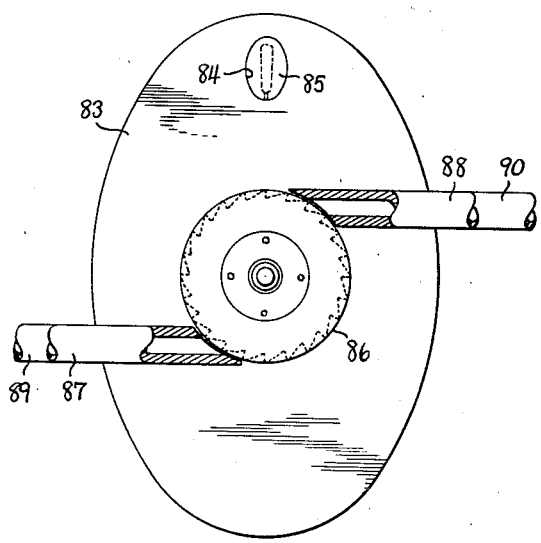
Fig. 14 is a front elevation of a modified form of rotor with air-nozzles shown in driving position with relation to the rotor.
Figure 15:
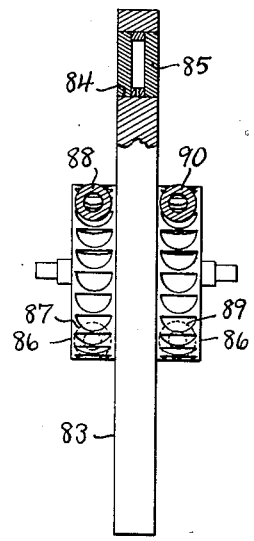
Fig. 15 is a left-hand elevation of the construction shown in Fig. 12 with the upper or cell portion thereof shown in section.

In the form of the invention illustrated in Figs. 14 and 15, an elliptical cell-containing rotor 83 of plastic has an elliptical cell-retaining opening 84 therein near the periphery and adapted to frictionally removably receive a correspondingly-shaped plastic elliptical analytical cell 85, although, of course, the cell and rotor could have the circular form, or any of the other features of the constructions heretofore described. Integrally united by cementing or otherwise to one or both sides of the plastic rotor element 83, or formed therewith from one piece of plastic, are drivers or driver-elements or turbines 86 of plastic, the driver-elements 86 having generally-circular peripheries provided with flutings or blades designed to be engaged by one or more streams of compressed air or other fluid directed through one or more of the four nozzles 87, 88, 89 and 90. By having one or more driver-elements 86 provided with the driving-blades or flutings, it is possible with a given air-pressure available, to secure a higher speed of rotation than is possible where the air directly drives the flutings on the outer surface of the large circular rotor such as shown in Figs. 1, 2, 3, 7, 8, 9, 10, 11, 12 and 13.

If it is desired to eliminate the danger of all heat-convection currents arising from friction of the rotor against the surrounding air and against the stream of air or other fluid used for driving the rotor, the rotor-element accommodating the analytical cell may be separated from the driver or turbine part, with the rotor-element rotating in a vacuum-chamber in a vacuum, or an atmosphere of hydrogen at reduced pressure, for example, of twenty millimeters pressure, and the driver or turbine-elements located outside of the vacuum-chamber. Three different ways of accomplishing this result are illustrated in the three different constructions shown in Figs. 16, 17 and 18.

In the form of the invention illustrated in Fig. 16, the cell-containing rotor 91 and the drivers or turbines 92 and 93 are all of plastic and are integrally united together by cementing or by forming of a single piece of plastic. The ends of the steel shaft 94 are suitably mounted in suitable bearings (not shown), for example, like in Fig. 2, and the drivers 92 and 93 can be driven by fluid under pressure, as has been previously described in connection with other forms of the invention. The cell-containing rotor 91 is enclosed within a vacuum-chamber diagrammatically indicated by the broken-line outline 95, which may be of any usual or well-known construction and may have any suitable or usual oil-glands or other devices at the locations where the plastic hub-portions 96 of the rotor extend through the steel vacuum-chamber 95 to prevent entry of air. Windows 97 and 98 in the vacuum-chamber are in line with the analytical cell 39 at one position of rotation of the rotor 91.

The form of invention shown in Fig. 17 is very similar to that shown in Fig. 16 except that the rotor 99 is mounted upon a steel shaft 100, which latter extends through any suitable or usual glands in the vacuum-chamber 101 indicated in broken-line outline, the axle 100 having drivers 102 and 103 secured adjacent the opposite end-portions of the axle, the ends of the axle being mounted in any suitable bearing (not shown). The drivers 102 and 103 may be of plastic or any suitable material such as metal.

In the form of the invention illustrated in Fig. 18, the cell-containing rotor 104 is formed of plastic and is suitably secured to a steel shaft 105 which may be of piano wire, which extends vertically through any suitable or usual gland in a vacuum-chamber diagrammatically illustrated by the broken line 106, and mounted in a suitable bearing 107, which may be an end-thrust R. M. B. miniature ball bearing. Secured on the upper end of the shaft 105 is a driver or turbine 108 of plastic or other suitable material for driving the rotor by a stream of fluid under pressure in a way heretofore more fully described.

Removable analytical cells and balancing cells of plastic, made as disclosed in this application can also be advantageously employed in rotors made of metal. Analytical and balancing cells as heretofore made have consisted of assemblies of materials of different densities, such as metal barrels and screws and non-metallic spacers and windows, which result in different stresses set up in different portions of the cell during rotation of the rotor, resulting in deformation of the metal barrels and screws and breaking or deformation of the windows. Cells made according to my invention, however, are substantially unitary and homogeneous throughout and due to these facts and the properties of plastics that have been heretofore set forth, cells made according to my invention are not only easier and simpler to make, but are substantially free of the deformation and breakage which occurs in the case of cells as heretofore made. Also, due to the low specific gravity of my improved cells, the bursting stress imposed on the rotor at the location of pressure of the cell in its retaining-opening is less than that of the higher specific gravity cells heretofore used.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A centrifuge construction comprising: a rotor formed substantially of sheets of plastic integrally united together; at least one of said sheets of plastic being formed to provide a cell-chamber within and adjacent the periphery of the rotor.

2. A centrifuge construction comprising: a rotor formed substantially of sheets of plastic integrally united together; at least one of said sheets of plastic being formed to provide a cell-member within and adjacent the periphery of the rotor; the sheet or sheets of plastic which provide the cell-chamber being of relatively-low light-transmitting plastic, and the sheets of plastic which overlie the opposite sides of the cell-chamber being of relatively-high light-transmitting transparent plastic.

3. In an ultracentrifuge, a rotor body consisting substantially entirely of a plastic composition having a modulus of elasticity of the order of 1,000,000, and means supporting said rotor for rotation about an axis of symmetry of said rotor, said rotor having at least one cavity spaced from said axis of symmetry and adapted to support material to be subjected to centrifugal force.

4. In an ultracentrifuge, a rotor body consisting substantially entirely of a plastic composition having a modulus of elasticity of the order of 1,000,000 and having a specific gravity of the order of one, and means supporting said rotor for rotation about an axis of symmetry of said rotor, said rotor having at least one cavity spaced from said axis of symmetry and adapted to support material to be subjected to centrifugal force.

5. In an ultracentrifuge, a rotor comprising a discoidal member consisting of a plastic composition having a modulus of elasticity of the order of 1,000,000, said discoidal member having at least one cavity in the body thereof between the center and the periphery thereof adapted to support material to be subjected to centrifugal force, and means supporting said discoidal member for rotation about an axis of symmetery thereof.

6. In an ultracentrifuge, a rotor comprising a discoidal member consisting of a plastic composition having a modulus of elasticity of the order of 1,000,000, said discoidal member having at least one cavity in the body thereof between the center and the periphery thereof adapted to support a container for material to be subjected to centrifugal force, and means supporting said discoidal member for rotation about an axis of symmetry thereof.

7. In an ultracentrifuge, a rotor comprising a discoidal member consisting of a plastic composition having a modulus of elasticity of the order of 1,000,000, said discoidal member having at least one cavity in the body thereof between the center and the periphery thereof adapted to support material to be subjected to centrifugal force, fluid-drive flutings positioned on said discoidal member about the periphery thereof, and means supporting said discoidal member for rotation about an axis of symmetry thereof.

8. In an ultracentrifuge, a rotor comprising a discoidal member consisting of a plastic composition having a modulus of elasticity of the order of 1,000,000, said discoidal member having at least one cavity in the body thereof adjacent the periphery thereof adapted to support material to be subjected to centrifugal force, and means supporting said discoidal member for rotation about an axis of symmetry thereof.

KURT G. STERN.